June 30, 1925.
E. E. MITCHELL
TIRE FABRIC STRIPPING MACHINE
Filed Feb. 28, 1924
1,543,944
3 Sheets-Sheet 1
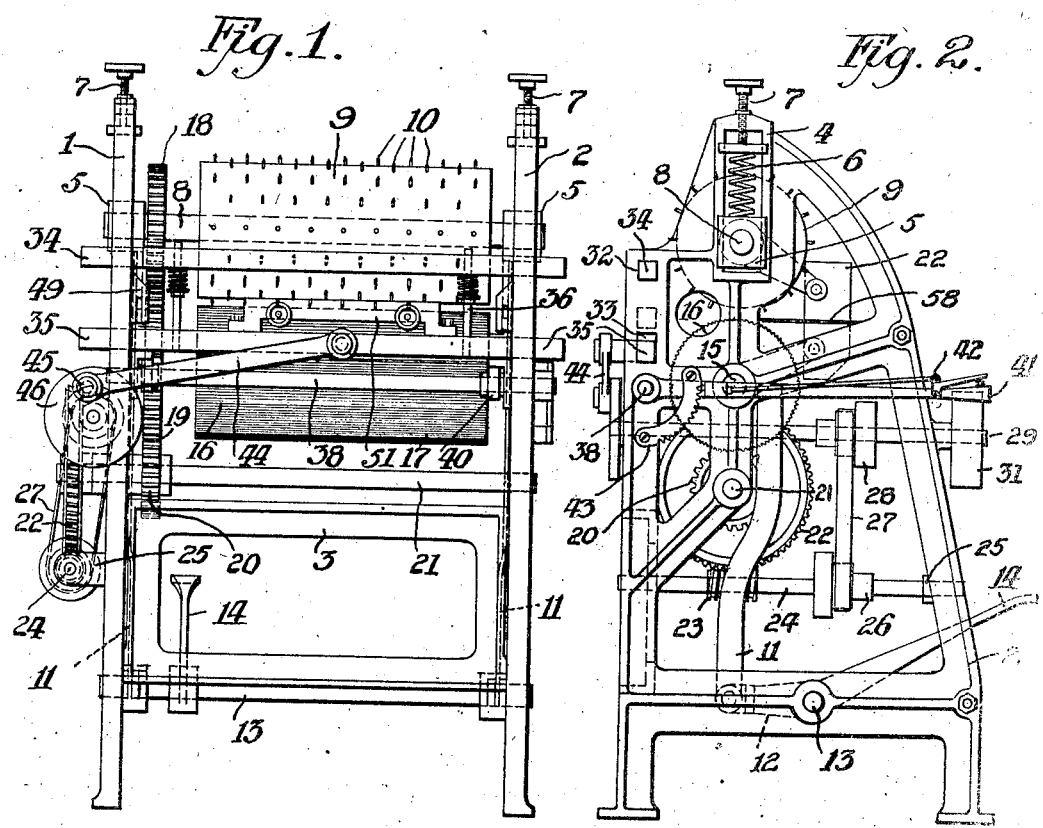
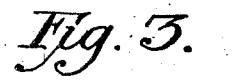
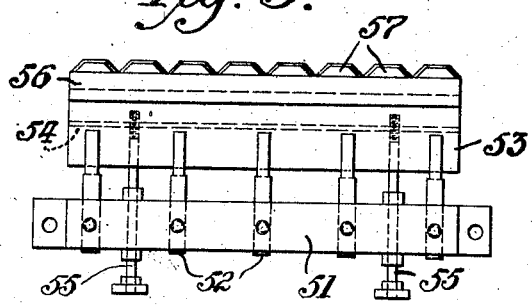
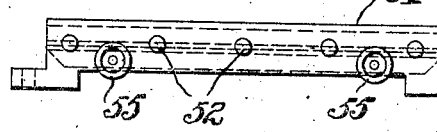
Inventor
Earnest E. Mitchell
By
Attorneys

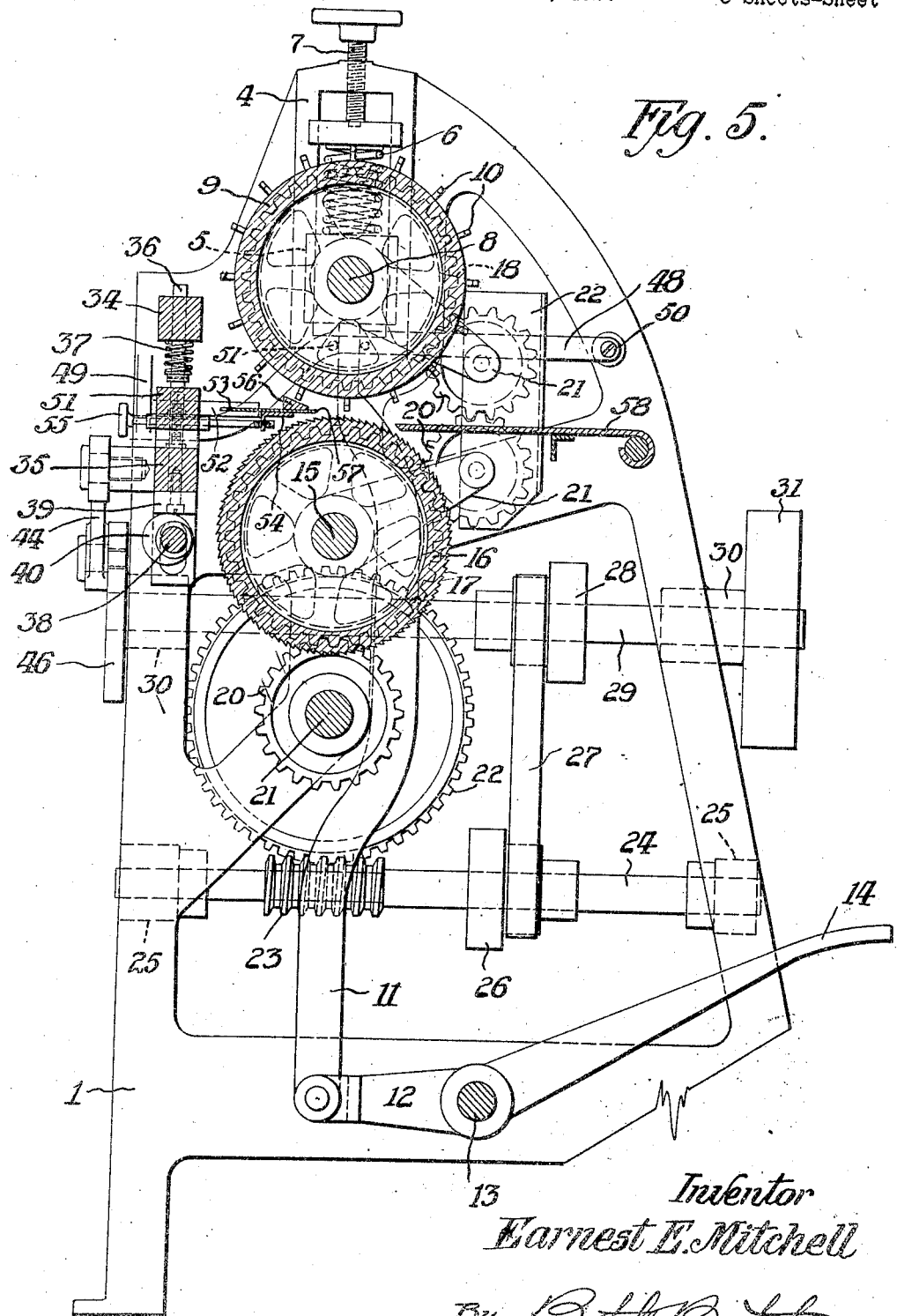

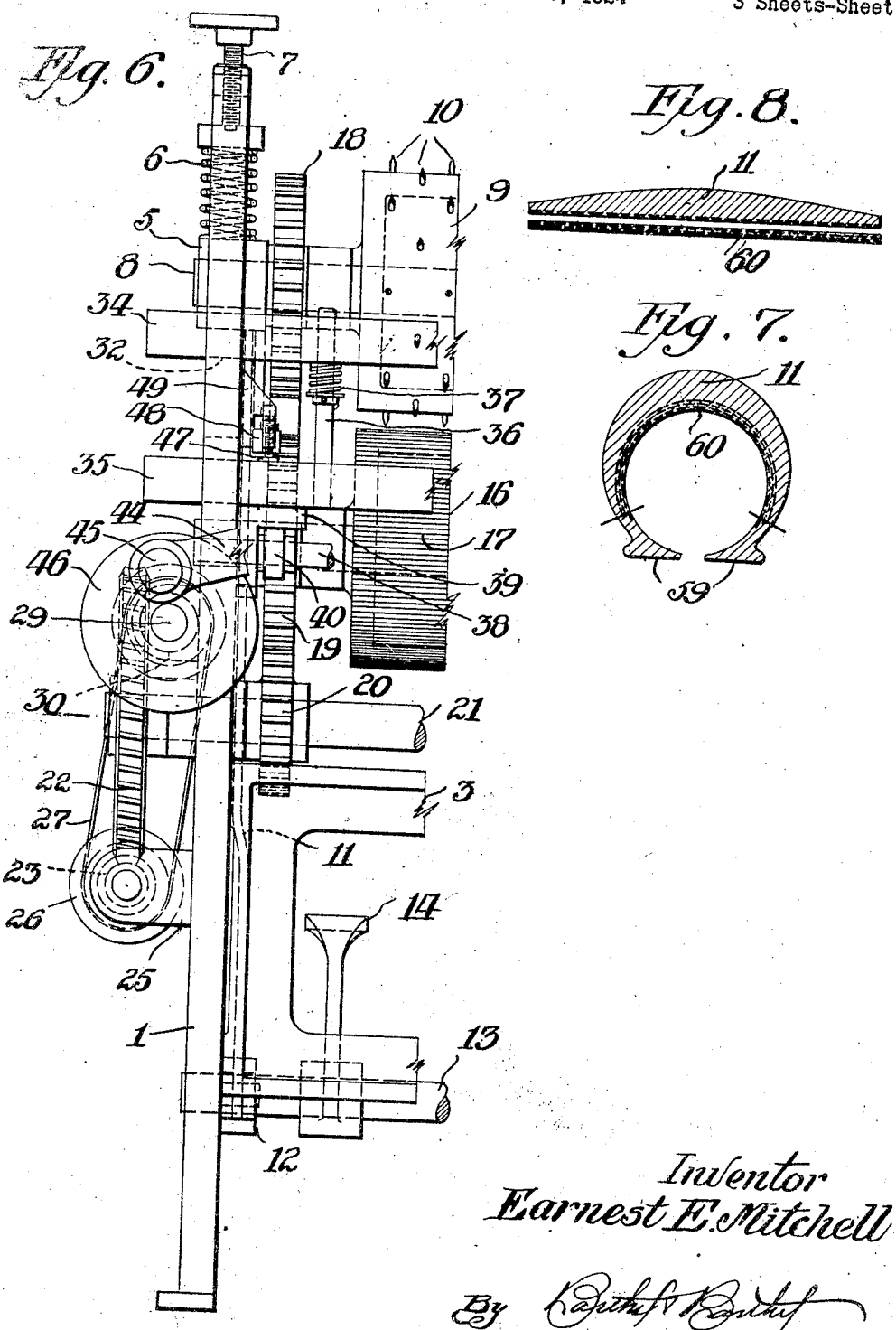

Patented June 30, 1925.

1,543,944

UNITED STATES PATENT OFFICE.

EARNEST E. MITCHELL, OF DETROIT, MICHIGAN.

TIRE-FABRIC-STRIPPING MACHINE.

Application filed February 28, 1924. Serial No. 695,242.

*To all whom it may concern:*

Be it known that I, EARNEST E. MITCHELL, a citizen of the United States, residing at Detroit, in the county of Wayne and State of Michigan, have invented certain new and useful Improvements in Tire-Fabric-Stripping Machines, of which the following is a specification, reference being had therein to the accompanying drawings.

This invention relates to a tire fabric stripping machine and my invention aims to provide a machine by which fabric may be recovered from worn, injured or discarded tires, so that pieces of the fabric may be used as patches for repairing punctures or otherwise injured outer tire casings or inner tubes. It is in this connection that an outer tire casing cannot be properly patched by a piece of fabric other than of the character in the tire casing, and my invention is adapted for recovering cord fabric from what is commonly styled cord tires, such tires having cord fabric embedded in vulcanized rubber. On account of the nature of vulcanized rubber the cord fabric cannot be conveniently cut from the vulcanized thread portion of an outer tire casing, but I have found that the fabric may be stripped and worked away from the rubber so that it is comparatively clean and in such condition as to be conveniently used for patching purposes.

My invention aims to provide a machine embodying feed rolls between which a piece of flattened outer casing is fed and operated upon by a shearing or spreading instrumentality which causes the fabric to be separated from the vulcanized rubber tread of the casing. The shearing or spreading instrumentality is reciprocated as an outer casing is fed against the instrumentality by the feed rolls, and provision is made for bringing sufficient pressure to bear on an outer casing to cause it to be positively fed against the spreading instrumentality. The machine may be operated at various speeds and is adapted to expeditiously and economically recover fabric from an outer tire casing.

The construction of the machine will be hereinafter specifically described and then claimed, and reference will now be had to the drawings, wherein—

Figure 1 is a front elevation of the machine;

Fig. 2 is a side elevation of the same;

Fig. 3 is a plan of a detached shearing or spreading instrumentality;

Fig. 4 is a front elevation of the same;

Fig. 5 is an enlarged vertical sectional view of the machine;

Fig. 6 is an enlarged front elevation of a portion of the same;

Fig. 7 is a cross sectional view of the outer casing of a tire showing places where the clencher flanges of the casing are removed, and Fig. 8 is a cross sectional view of a portion of the outer casing which has been flattened and a strip of fabric removed therefrom.

The machine comprises side frames 1 and 2 arranged in parallelism and connected by various means of maintaining a rigid structure, particularly by a transverse frame 3. In the upper ends of the frames 1 and 2 are vertically disposed housings 4 for adjustable bearings 5 pressed by springs 6 adapted to have the tension thereof regulated by screws 7.

Journaled in the bearings 5 is a transverse shaft 8 and mounted on said shaft is an upper feed roll 9 having its periphery provided with a multiplicity of pins 10 or projections that will extend into the vulcanized tread 11 of a flattened outer casing fed under said roll. In order that the casing may be started under the roll provision is made for raising the roll. Engaging the bearings 5 are vertically disposed side arms 11 and these side arms have the lower ends thereof connected to cranks 12 on a rock shaft 13 journaled in the side frames 1 and 2, said rock shaft having a treadle 14 so that foot pressure, by an operator at the rear side of the machine, may raise the bearings 5 and the upper feed roll 9.

Journaled in the side frames 1 and 2 is another transverse shaft 15 and mounted on this shaft is a lower feed roll 16 having its periphery provided with longitudinally disposed saw teeth 17 or such serrations as will engage an outer casing and cause it to be fed forward between the rolls.

The shafts 8 and 15, adjacent the side frame 1, are provided with large gear wheels 18 and 19 respectively, and these gear wheels mesh with small intermeshing gear wheels 20 supported by arms 21 from the shafts 8 and 15, the arms 21 being connected by a link member 22 which serves as a shield or guard for the small gear wheels 20 and at the same time retains these small gear wheels constantly in mesh, particularly when the upper feed roll 9 is raised relative to the lower feed roll 16. In other words, there is always a driving relation established between said rolls with said rolls revolving in a clockwise direction to feed an outer casing from the rear side of the machine to the front side thereof.

Meshing with the large gear wheel 19 is a small gear wheel 20 on a transverse shaft 21 journaled in the frames 1 and 2, said shaft having an end thereof provided with a worm wheel 22 meshing with a worm 23 on a shaft 24 journaled in bearings 25, carried by the side frame 1. On the shaft 24 is a stepped pulley 26 for a belt 27 trained over a stepped pulley 28 on a power shaft 29, said shaft being journaled in bearings 30, carried by the side frame 1. The power shaft 29 has a pulley 31 so that it may be operated from a suitable source of power or said shaft may be coupled direct to a motor. The belt 27 can be changed to provide different speeds of operation for the machine.

The side frames 1 and 2 have transversely alining openings 32 and 33 and slidable in these openings are the ends of transverse bars 34 and 35. The transverse bar 35 is provided with posts 36 extending into the transverse bar 34 and on said posts are coiled expansion springs 36 which hold the bars 34 and 35 normally separated, but permit of the bar 35 being raised towards the bar 34.

Journaled in the side frames 1 and 2, below the bar 35 is a cam shaft 38 and slidable on said cam shaft, against the frames 1 and 2 and engaging under the bar 35 are angle brackets 39 normally engaged by cams 40 on the cam shaft 38. One end of the cam shaft 38 has a lever 41 extending to the rear side of the machine so that it may be manipulated for rocking the cam shaft to adjust the cams 40 and raise the bar 35 relative to the bar 34. A lever 41 has a conventional form of ball locking device 42 operatable relative to a rack 43 carried by the side frame 2.

Attached to the middle portion of the bar 35 is a pitman 44 connected to the wrist pin 45 of a wheel 46 mounted on the forward end of the outer shaft 29 and it is by virtue of this wheel and pitman that the bars 34 and 35 will be reciprocated. The bars 34 and 35 slide in the openings 32 and 33 with the bar 35 sliding on the angle brackets 39 and to hold the bar 35 on said angle brackets, against accidental vertical displacement, are set screws 47 which engage the upper surface of the bar 35. The set screws 47 are carried by the forward ends of arms 48 in guides 49, carried by the inner faces of the frames 1 and 2, and said arms extend rearwardly and are pivotally supported, as at 50 by the frames 1 and 2. These arms may be provided with studs 51 serving as guides for the upper ends of the side arms 11. The arms 48 are loose in the guides 40 and do not interfere with a cam adjustment of the bar 35 towards the bar 34, such adjustment being very small, as will hereinafter appear.

Mounted on the bar 35 is a holder 51 and mounted in said holder are a plurality of slotted supports 52 for a blade 53 which has its lower face provided with an angle bar 54 connected to the holder 51 by adjusting rods 55, these rods permitting of the blade 53 being shifted in the slotted supports 52 relative to the holder 51. The blade 53 has its upper face provided with a deflector 56 which also serves as a reinforcement for said blade and tends to separate fabric from a tread of an outer casing. The edge of the blade has a series of blunt teeth 57, which do not actually cut but have a ripping, stripping or separating action as the blade is rapidly reciprocated between the piece of fabric and the tread adhering thereto.

At the rear side of the machine is a platform or table 58 supported between the side frames 1 and 2 and extending into the pass between the rolls 9 and 16.

Reference will now be had to Figs. 7 and 8 showing a portion of the outer casing of a tire. The clencher edges or piece 59 are removed, the casing cut into segments and then the segments flattened out, either before feeding the same into the machine or the flattening out may be accomplished on the platform 58. Before starting a flattened casing strip between the feed rolls 9 and 16, the end of the strip is cut so as to separate the fabric 60 from the tread 11. The feed roll 9 is then raised and the strip placed between said rolls with the tread 11 extending on to the separating member 56 and the fabric 60 extending under the blade 53. The feed roll 9 is then lowered by releasing the treadle 14 and pins or projections 10 of the feed roll will engage in the tread 11, while teeth 17 of the feed roll 16 will engage in the lower side of the fabric 60. The machine being placed in operation, the strip will be fed between the feed rolls 9 and 16 and the blade 53 will be rapidly reciprocated so as to separate the fabric 60 from the tread 11. The blade 53 works its way through the rubber binding the fabric to the tread and this operation is continued until the strip of casing has had the fabric removed therefrom.

Since all tire casings may not be alike provision has been made for adjusting the stripping instrumentality relative to the feed rolls. It is by virtue of the cams 40 that the reciprocating bar 35 is raised to correctly position the blade 53 relative to the lower feed roll 16, so that desired thicknesses of fabric may be stripped from the casing. It is through the medium of the adjusting rods 55 that the blade 57 may be shifted into and out of the pass between the feed rolls and it is through the medium of such adjustment that different kinds of fabric may be stripped from an outer casing or carcass of any tire.

It is thought that the operation and utility of my invention will be apparent without further description, and while in the drawing there is illustrated a preferred embodiment of my invention it is to be understood that the structural elements are susceptible to such variations and modifications as fall within the scope of the appended claims.

What I claim is:—

1. Means for recovering fabric from outer tire casings, comprising a reciprocatory stripping instrumentality, feed rolls for forcing a piece of casing against said stripping instrumentality, and means adapted for simultaneously revolving said rolls and reciprocating said stripping instrumentality.

2. A machine of the type described, comprising an upper feed roll provided with pins, a lower feed roll provided with teeth and cooperating with said upper feed roll in forming a pass through which may be fed an outer casing, means for simultaneously revolving said rolls, means for adjusting the upper roll relative to the lower roll, and a reciprocating instrumentality driven in unison with said rolls and adjustably supported in said pass so that said rolls may force an outer casing against said instrumentality to separate parts of said casing.

3. A machine as called for in claim 2, wherein said reciprocating instrumentality is in the form of bars, one of which is adjustable relative to the other and a blade adjustably supported by the adjustable bar.

4. A machine of the type described comprising side frames, upper and lower feed rolls rotatable between said frames, means carried by said frames adapted for raising the upper feed roll relative to the lower feed roll, upper and lower bars slidable in said frames, a separating instrumentality supported by the lowermost bar in proximity to the pass between said feed rolls, and means operated from said roll operating means for reciprocating said bars.

In testimony whereof I affix my signature in presence of two witnesses.

EARNEST E. MITCHELL.

Witnesses:
KARL H. BUTLER,
ANNA M. DORR.